Figure 1:
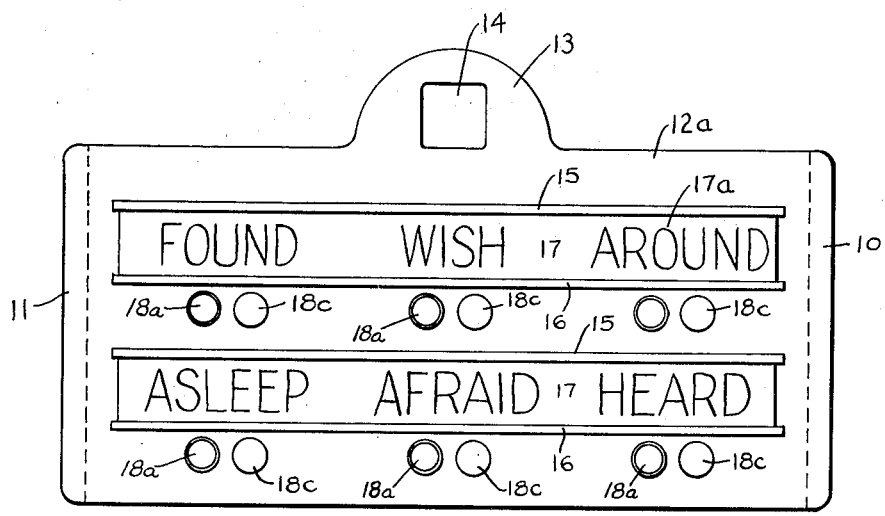

March 27, 1951 T. W. JONES 2,546,543
EDUCATIONAL DEVICE
Filed May 20, 1946 2 Sheets-Sheet 1

INVENTOR.
T. W. Jones
BY
Kimmel & Crowell
ATTYS.

March 27, 1951  T. W. JONES  2,546,543
EDUCATIONAL DEVICE

Filed May 20, 1946  2 Sheets-Sheet 2

INVENTOR.
T. W. Jones
BY
Kimmel & Crowell
ATTYS.

Patented Mar. 27, 1951

2,546,543

UNITED STATES PATENT OFFICE 2,546,543

EDUCATIONAL DEVICE

Timothy W. Jones, Tuskegee, Ala.

Application May 20, 1946, Serial No. 670,904

1 Claim. (Cl. 35—9)

This invention relates to improvements in educational apparatus and more particularly to display boards designed to reveal variable legends before the observing eyes of a student in a school from one side of the board in connection with which he endeavors to selectively and electrically indicate to the teacher stationed in back of the board the particular legend she has already placed in an open electrical circuit which the student closes if and when he locates the same legend from in front of the display apparatus by contacting a pointer therewith.

It is well known that various mental tests are conducted in elementary schools to promote the analytical powers of students in various school grades by exciting emotional as well as diversive faculties of mind in connection with the study on hand, such as arithmetic, spelling, geography and kindred subjects. In the stimulation of quickness of perception, sharpness of intellectual response, and directness of intuition in the course of any interval of time allotted to such mental tests, the present invention has been designed along lines of simplicity, efficiency and low cost.

One of the particular objects of this invention is to provide an educational display apparatus in which special aptitudes of school children can be developed in the class room by aid of audible as well as visual effects of themselves attractive to the students because tending to disclose the existence of power to secure such effects at will perceptively. In carrying out this purpose I have provided a display board facing the student at its front side and the teacher from behind, where the student is required to observe a selective list of, say, words indicated upon the board and place a pointer he holds in his hand upon a contact point under that particular one of the legends which he thinks answers the question put to him by the teacher which calls for so indicating this particular legend not only for the purpose of fitting the case involved, but for the purpose of illuminating this legend by a flash of light should he be correct in making his selection, but otherwise effecting no such illumination of any legend at all, should he place the pointer on the wrong legend.

Another object thereof is to put within control of the teacher the means of initiating the ultimate lighting up of any legend she desires, not only from in front of the board for observation of the student being tested, but from back of the board where she herself may observe same. This act on her part is selectively done in order to close an electrical circuit to that particular set of lamps and no other lamps when the student places the pointer upon the right contact point under the right legend, for in doing so and only then is the circuit completely closed to flash both lamps or lights.

A still further object of this invention is to provide means for changing the signs or display cards employed both at the front and rear sides of the display boards at the will of the teacher, to adapt same to be instructive on variable subjects of study.

With the above and other objects in view my invention consists in the combination, arrangement and details of construction disclosed in the drawings and specification, and then more particularly pointed out in the appended claim.

Figure 5:
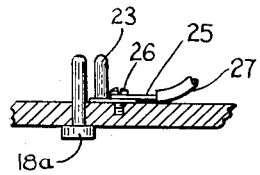
Figure 2:
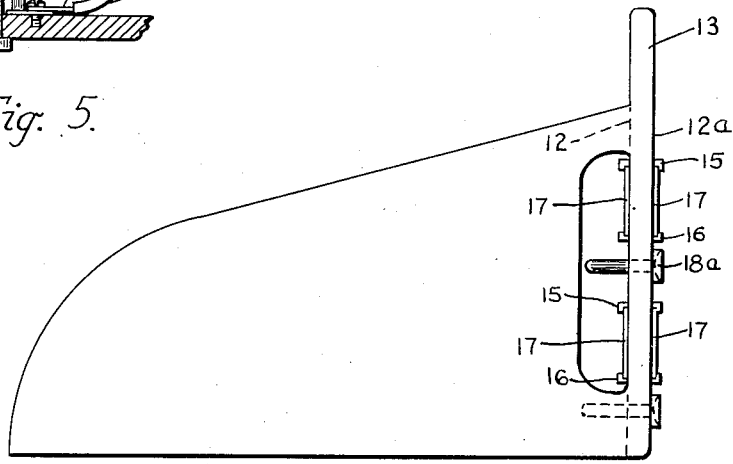
Figure 6:
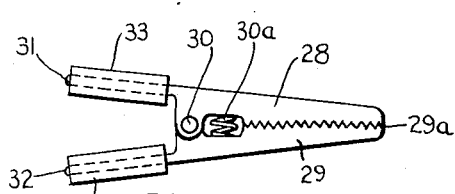
Figure 3:
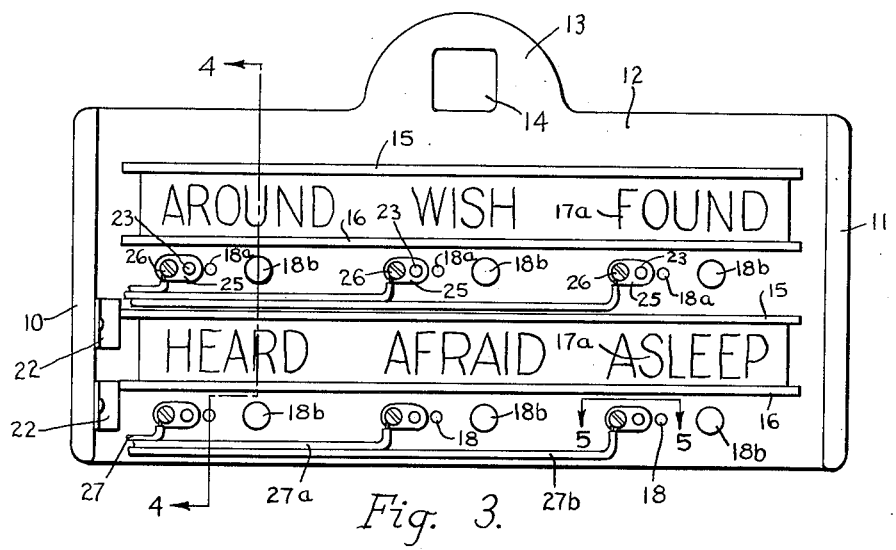
Figure 4:
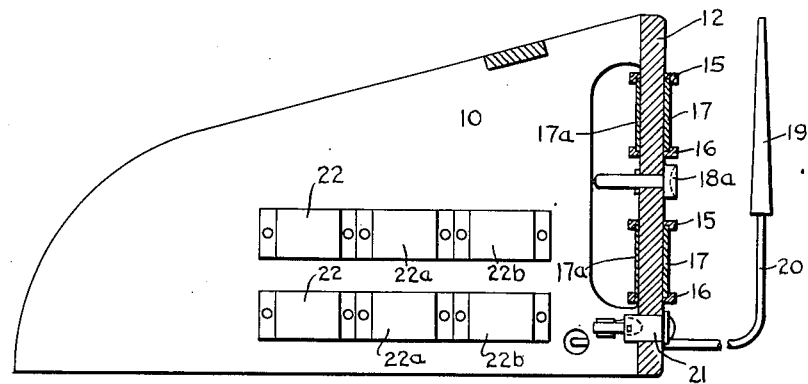
Figure 7:
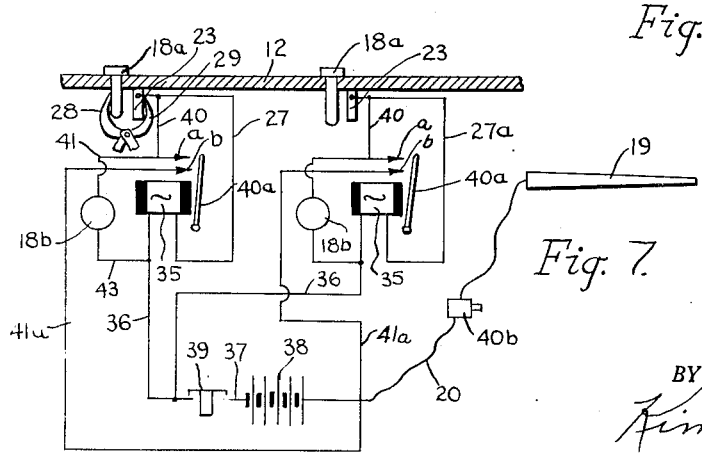

In the drawings, wherein similar reference characters designate similar parts throughout the respective views, Figure 1 is a front elevation of my invention, Figure 2 is a side elevation with one end wall removed, Figure 3 is a rear elevation thereof, Figure 4 is a longitudinal sectional elevation thereof, Figure 5 is a fragmental detail view of an electrical connection upon a wall, Figure 6 is a side view of a clamp operating as a switch, and Figure 7 is a diagrammatic view of an electrical circuit making hook-up for placing all parts of my invention in electrical relation thereto.

Referring to the drawings, which are merely illustrative of my invention I disclose the parts of my invention. I provide a display board or sign carrier held in erect position by means of oppositely arranged side walls 10 and 11 and the cross front board 12 constituting the display board proper. The side walls preferably will slightly taper from wide at the front display board to narrow at their rear ends. The upper central part of the board 12 may have a raised portion 13 in which a window 14 may be placed.

I mount a series of superimposed guide members so they extend longitudinally of the board 12, both in front thereof as well as in back, in parallel rows that accurately and coincidingly register from opposite sides of the board 12. Each guide member consists of the channel-shaped metal frame having marginal oppositely arranged guiding beads 15 and 16 respectively in which cardboard strips 17 may be removably inserted to display signs. There will be imprinted in longitudinal spaced apart order upon each removable strip 17 legends 17a relating to any subject matter being studied in the school classroom such as spelling, rhetoric, geography, history, etc. Care will be taken that the same legends, in exactly the same order of positions on any point of the board can be read from either the card strips 17 on one side or the other of the board. This is done by placing the same legends in pairs, so that one legend of each pair is in coinciding registration with the other on opposite sides of the display board 12. This arrangement can be observed from Figures 1 and 3 showing opposite sides of the same board.

A contact point 18a is separately located under each legend appearing on the front side of the board, which projects through the board on the other side thereof so as to be exposed from that side also. In close proximity to each such contact point will be positioned, upon opposite sides of the board an electric lamp. The lamps on the front side of the board are designated 18c, and those on the reverse side of the board are designated 18b. A second contact point 23 projects only from the reverse side of the board 12, in close proximity to the projecting end of contact point 18a. An electrically insulated pointer 19 is attached to the outer end of a cord 20, which at its inner end is mounted upon a contact member 21 operatively secured to the board 12. There is also furnished, in operating this apparatus, a clamp consisting of oppositely arranged clamping jaws 28, 29 having jagged or serrated contacting surfaces 29a. These jaws or levers 28, 29 are operatively pivoted together, as at 30, and projecting beyond the pivotal point thereof are handles 31, 32 divergingly spreading out from the jaws outwardly. Operatively opposing the opening of jaws 28, 29 is a spring 30a. Operatively encasing the handles 31, 32 of the clamp are rubber or other insulating sleeves 33, 34 to electrically insulate the operating handle of the clamp. Contact cleats 25 are electrically connected upon the back of board 12 (Figure 3) to contact points 23, and are secured by fasteners 26 to electrical wires. The three cleats shown are connected to a set of three wires included in an electrical circuit, said wires being respectively designated 27, 27a and 27b. Secured operatively on one of the walls 10 which supports the display board 12 are contact plates which have separate chambers 22, 22a and 22b for reception of instruments used as annunciators for rendering an audible sound.

The electrical circuit connections are operatively disclosed in Figure 7. Here there are disclosed all parts diagrammatically in a manner known to those skilled in the electrical art. A battery is designated 38, from one side of which extends a flexible cord 20 which, as already stated carries the pointer 19. This cord is of ample length to make the pointer reachable for engagement with any contact point 18a displayed in front of the board 12. From the other side 37 of battery 38 extends a wire 36 running to one end of each separate magnet or relay 35. Any approved kind of switch 39 may temporarily be caused to open and close the circuit, intervening preferably between wire 36 and its point of attachment 37 to the battery 38.

An electrical conductor, such as 27 or 27a connects the contact point 23 with the other end of each of the respective magnets or relays 35. A pair of switch points a and b are provided along with an armature 40a adapted to electrically connect the switch points to each other when the respective magnet 35 is energized. A conductor 43, having the light bulb 18b interposed therein, extends from the switch point a to the wire 36. A jumper wire 40 connects the lines 27, 27a and the wire 43. Another conductor 41a extends from the switch point b to the side of the battery 38 to which the pointer cord 20 is electrically connected. A buzzer or annunciator 40b is tapped into the wire or cord 20. Both lamps of each pair of lamps on opposite sides of board 12, lamps 18b and 18c, respectively, are interconnected so as to flash together at the same time in a well-known manner. It is the purpose of lamps 18b and 18c to remain lighted and form a permanent record of successful completions. It is assumed that the teacher will permit each student to make a series of trials for different legends.

In operation the device functions as follows: Assuming that the legends 17a are words which are imprinted on the removable strips 17, these strips will be inserted into their guide members on opposite sides of the board, occupying the registering positions for legends on the strips as well as for the strips already explained hereinbefore. The teacher, let us say, gives a sentence to the student who is standing in front of the display board, in which some word is purposely deleted to be supplied by the student electrically for he is not required to speak the word out vocally. The teacher who is behind the same display board, in giving the sentence, knowing that the word called for is indicated upon the front side of the display board facing the student, because the same word faces her upon one of the strips 17, takes the clamp shown in Figure 6 for testing the student progressively on other words, opens the jaws 28, 29 thereof, against the tension of spring 30a, and clamps these jaws onto both contact points 18a and 23 at the same time as indicated diagrammatically in Figure 7 and manually closes the switch 39. In this manner both contact points 23 and 18a are bridged. The particular contact points she has bridged are located directly under the word she wants the student to indicate electrically from his side to the board for his own edification, as well as electrically from her side of the board for her information. The student mentally alerts himself, takes hold of pointer 19 and places the same into electrical contact with the point 18a below that particular word which he thinks is the one that will correctly fit the deleted part of the sentence. The moment that the pointer touches contact point 18a on whichever legend 17a the student has selectively laid said pointer, one of two conditions will be fulfilled; either the student has been correct in his selection of the right word, or not. In the first case, if he has indicated electrically the right word the electrical circuit will be closed as follows with the effects noted. Current will flow from one side of battery 38 by way of wire or cord 20 to pointer 19. Thence current will flow by way of contact point 18a engaged by the pointer 19, clamp 28, contact point 23, clamp jaw 29, wire 27, to one end of magnet 35, then by the other wire 36 running from this magnet back to battery 38 on its other side, by way of closed switch 39. The magnet 35 is now energized, and so is the annunciator bell 40b which rings to announce the fact to the class room that the student has successfully solved the question. When the current flows through the magnet 35, the armature 40a will be attracted to bridge the switch points a and b. A flow of current will then occur through line 41a, switch point b, armature 40a, switch point a, line 43 and the light bulb 18b, and finally back to the battery through the conductor 36. Since the lamps or bulbs 18b and 18c on opposite sides of the board are connected together, such current flow will effect the illumination of the bulbs on both sides of the board to indicate the legend that has been correctly indicated by the student. The student is more impressed by such showing visually and audibly than would be the case if he announced the right word vocally and his striving to be correct in each instance of attempting to supply the right answers to the questions put to him by the instructor is more keen and decisive accordingly. By opening the switch 39, the circuit is open again and the same operation must be gone through again for successfully energizing electrically the right words in subsequent tryouts by the student in response to the presettings made by the instructor.

After making one trial, the teacher may move the clamp (shown in Figure 6) and close it on the double contacts of another legend. If the first trial was successful, the magnet 35 will remain closed after the clamp has been removed so long as the switch 39 is kept closed. This may be shown by the fact that after the magnet 35 closes (as it will upon a successful completion), current will flow in the following manner: from the source of supply, through switch 39, through wire 36 to the magnet 35, through wires 27 or 27a and 40 to contact a, through closed armature 40a to contact b, through contact b and wire 41a to the other side of the source of supply—completing the electrical circuit. Since the magnet will continue to be energized the lights 18b and 18c will continue to be illuminated and a visual record will remain of the problems that have been successfully answered. Therefore, it is possible to examine each student on several problems and to have a continuing record of his progress. After a student has been completely questioned the switch 39 may be opened to clear the board, that is, to de-energize all of the magnets and extinguish the lights in preparation for a new set of questions.

I do not mean to confine myself to the exact details of construction disclosed herein but cover all variations falling within the purview of the appended claim.

What I desire to claim is:

An educational device of the kind described comprising a display board, a plurality of spaced apart electrical contact members on said board and extending therethrough, a second contact member adjacent each of said first contacts on one side of the board, a contact connecting member engageable with a selected pair of first and second mentioned contacts, an electrical circuit connected to said second contact members, a freely movable contact member in said circuit engageable with said first contact member for completing said circuit, a signal member associated with each of said pair of contacts in said circuit for indicating the completion thereof, a relay in said circuit including an armature, a second electrical circuit including a pair of contact members connected parallel to said first and second contacts when said freely movable contact is engaged with said first contact member, said armature engageable with said second pair of contact members upon initial actuation of said relay upon completion of said first named circuit for holding said first named circuit closed and keeping said signal member in operation after said first contact member and said freely movable contact member are disengaged.

TIMOTHY W. JONES.

REFERENCES CITED

The following references are of record in the file of this patent:

UNITED STATES PATENTS

| Number | Name | Date |
|---|---|---|
| 1,278,395 | Singer | Sept. 10, 1918 |
| 1,810,529 | Rice | June 16, 1931 |
| 1,949,783 | Cleaver | Mar. 6, 1934 |